United States Patent Office 3,788,838
Patented Jan. 29, 1974

3,788,838
METHOD OF REMOVING VAPORIZED LEAD FROM GASES AFTER CONTACT WITH LIQUID LEAD
Werner Wenzel and Leon-Michel Chaussy, Aachen, Germany, assignors to Rheinische Braunkohlenwerke AG, Cologne, and Werner Wenzel, Aachen, Germany
No Drawing. Filed June 10, 1970, Ser. No. 45,206
Claims priority, application Germany, June 20, 1969, P 19 31 481.9
Int. Cl. C22b 13/00
U.S. Cl. 75—77                   10 Claims

ABSTRACT OF THE DISCLOSURE

In order to remove vaporized lead from a gas following its contact with liquid lead, said gas, prior to subsequent use, is contacted with a liquid metal or alloy which precipitates said vaporized lead.

---

The use of lead as a heat exchange medium has significant advantages over other materials, particularly gaseous materials used for this purpose. It has been, however, a practically unavoidable disadvantage of lead when used for heat exchange purposes at temperatures in excess of approximately 900° C., that substantial lead vapor pressure develops which sharply increases with increasing temperatures. If, during the heat transfer gases participate in a direct heat exchange with the liquid lead, then substantial quantities of lead mix in vapor form with the gases. As a result, first, lead losses occur and, secondly, the gases are contaminated which may have a harmful effect in their further use.

For example, a gas-lead contact occurs when the liquid lead is used as an intermediate heat exchange medium in a nuclear reactor. In such a case the lead serves for the transfer of heat from the gaseous coolant of a nuclear reactor to a reaction gas. In the aforenoted temperature range, helium is used as a gaseous coolant for the reactor. The reaction gas to which the heat of the helium is to be transferred may be a mixture of carbon monoxide and carbon dioxide. This gas mixture may subsequently be used, for example, for the reduction of iron ore.

In the aforenoted example, the vapor pressure of the lead has an unfavorable effect on both components (i.e. the helium and the reaction gas) of the gaseous system. In the reactor coolant the presence of lead vapors is undesirable particularly if, in a heat utilizing stage coupled downstream of the heat exchanger, a turbine is to be driven by the helium. In the reaction gas the lead vapor pressure is particularly disadvantageous because of the lead losses that occur.

It is an object of the invention to provide an improved method which eliminates the lead vapor from gases contacting liquid lead.

Briefly stated, according to the invention, the gases, after having been brought into contact with the liquid lead for the purpose of heat exchange, are contacted with other liquid metals which cause precipitation of the vaporized lead.

It was found that for the separation or precipitation of lead from its vapor phase when mixed with the aforenamed gas components (helium and reaction gas), particularly liquid tin or tin-containing liquid alloys are suitable. Such alloys may be formed, for example, mostly of tin and, in addition, up to approximately 5% iron, dependent on the temperature, or approximately 20% nickel or approximately 80% copper, also dependent on the temperature. Ternary or quarternary alloys may also be used which have approximately 87% tin, approximately 3% iron, and approximately 10% nickel or 50% tin, approximately 5% iron, approximately 15% nickel and approximately 40% copper.

Thus, for example, when the separation process is concerned exclusively with the precipitation of lead vapors, liquid tin alone may be used. Or, a tin-copper alloy may be employed, wherein the maximum copper content is obtained from the binary Sn-Cu system at the temperature of the separation process. The purpose of the introduction of copper is the fact that the vapor pressure of copper is less than that of tin. In case the temperature during the separation process is over 1080° C., the copper content may be as high as desired. In such a case it has to be considered, however, that the lead activity in a pure Cu-Pb alloy has a positive deviation from Raoul's law.

When, one the other hand, the separation process is coupled with a simultaneous reduction of small carbon dioxide quantities of the gas phase, then to the Pb-Sn alloy a metal has to be added which has a sufficient dissolving capacity with regard to carbon. On the other hand, the activity of carbon should be approximately unity in the solution (i.e. it should be carbon-saturated), and, on the other hand, the dissolved carbon should be available in sufficient quantities to ensure that the equilibrium of the two opposing reactions (oxidation of carbon with carbon dioxide and dissolution of carbon in the separation phase) be only slightly under $a_C = 1$. As phase components having a sufficiently large dissolving capacity for carbon, Ni and Fe may be considered. The maximum iron or nickel content of the alloy is obtained from the respecctive binary Fe-Sn or Ni-Sn systems. Nickel is soluble in tin in greater quantities than iron and affects less the activity of lead. If the extent of the $CO_2$-reduction is to be augmented, then an addition of copper may further increase the nickel content of the separating phase.

If an additional reduction of $H_2S$ is desired, copper and iron (both of identical effect) are added to the alloy.

The gases to be rendered lead-free are either passed through the metal bath or are introduced into a tower in which the metal alloy is caused to drip downwardly.

In order to ensure low activity of the liquid lead in the alloy after separation of the lead vapor from the gas, the liquid lead is continuously removed from the liquid phase. The requirement for the low lead activity may be explained as follows:

In metallic alloys, assuming a sufficient difference between the melting points, the law $$a_1 = n_1 a_0$$

applies, wherein $a_1$ is the activity or vapor pressure of the dissolved component $i$; $n_1$ is the mole fraction of the component $i$ and $a_0$ is the activity or vapor pressure of the pure component $i$ at the temperature during the uniting phase. The component $i$ in the present instance is lead. In order to effect a condensation of lead from the gas phase into the liquid phase, $a_1$ in the liquid phase has to be smaller than the partial pressure of the lead in the gas phase. This is achieved if, according to the above equation, $n_1$ is maintained at a smallest possible value. Thus, since due to the separation of the lead vapors from the gas phase $n_1$ increases, a continuous removal of the lead from the liquid phase is necessary.

The lead precipitated in the liquid metal may be continuously removed therefrom in known ways. Thus, for example, in case the precipitated lead is to be withdrawn from liquid tin, the liquid metal may be taken out continuously as a partial stream from the purifying apparatus and may be freed of its lead content. According to a known method, one component is liquated by cooling and thus separated from the remainder of the molten mass. A further possibility resides in the chlorine treatment of the molten material to be purified by taking advantage of the higher affinity of lead to chlorine than to tin.

The removal of lead from the liquid alloy may also be performed in a known manner by a vacuum process which, from a pyrotechnical point of view, has the advantage that the operation may be performed at practically constant temperatures and no chemical heat losses or material losses occur.

According to a further development of the invention, the liquid metal alloy separating the lead from the gases is used for chemically affecting said gases. Thus, according to the invention, in the aforenoted example of heat exchange between liquid lead and a mixture of carbon monoxide and carbon dioxide used subsequently for reduuction purposes, for the separation of the lead vapors a tin alloyed containing iron and/or nickel is used. This alloy is carburized by carboniferous material, such as coke, to the point of carbon saturation. Such a carbon-saturated alloy is capable of reacting, under the generation of carbon monoxide, with the $CO_2$-content of the gas to be rendered lead-free. Thus, its potential for reducing iron ores is increased. It is noted that the rate of continuously dissolving carbon in the alloy may equal the rate of carbon consumption during the carbon dioxide reduction of hot gas containing lead vapor upon its contact with the alloy.

That which is claimed is:

1. A method of separating vaporized lead from a hot gas containing lead vapor and selected from the group consisting of helium and mixtures of carbon monoxide and carbon dioxide comprising contacting the hot gas containing lead vapor with a molten metal material selected from the group consisting of tin, tin alloys, and copper alloys and causing the molten metal material to form an alloy with the precipitated lead under low lead activity.

2. The method of claim 1, wherein said hot gas containing lead vapor is helium and said molten metal material is liquid tin.

3. The method of claim 1, wherein said hot gas containing lead vapor is helium and said molten metal material is an alloy containing at least 87% of liquid tin.

4. The method of claim 1, wherein said hot gas containing lead vapor is a mixture of carbon monoxide and carbon dioxide and said molten metal material is liquid tin.

5. The method of claim 1, wherein said hot gas containing lead vapor is a mixture of carbon monoxide and carbon dioxide and said molten metal material is an alloy containing about 95% of tin and about 5% of iron.

6. The method of claim 1, wherein said hot gas containing lead vapor is helium and said molten metal material is an alloy containing about 95% of tin and about 5% of iron.

7. The method of claim 1, wherein said molten metal material is an alloy containing about 80% by weight liquid copper and about 20% by weight liquid tin.

8. The method of claim 1, wherein said hot gas containing lead vapor is helium and said molten metal material is an alloy containing about 87% of tin, about 3% of iron, and about 10% of nickel.

9. The method of claim 1, wherein said hot gas containing lead vapor is a mixture of carbon monoxide and carbon dioxide and said molten metal material is an alloy containing about 87% of tin, about 3% of iron, and about 10% of nickel.

10. A method as defined in claim 9, wherein said alloy contains carbon which is replaced by dissolution in said alloy at a rate of its consumption by the carbon dioxide reduction of said hot gas containing lead vapor upon its contact with said alloy.

References Cited
UNITED STATES PATENTS

| | | | |
|---|---|---|---|
| 2,307,944 | 1/1943 | Osborn et al. | 75—63 |
| 2,473,304 | 6/1949 | Robson | 75—88 |
| 2,758,023 | 8/1956 | Bareis | 176—37 X |
| 2,766,114 | 10/1956 | Najarian | 75—88 |
| 2,781,257 | 2/1957 | Wilkins | 75—88 |
| 3,105,028 | 9/1963 | Long | 176—37 |
| 3,219,538 | 11/1965 | Glueckauf et al. | 176—37 |
| 3,240,555 | 3/1966 | Nash | 176—37 X |
| 3,275,522 | 9/1966 | Kinsey et al. | 176—37 |
| 3,484,233 | 12/1969 | Bonilla | 75—78 |
| 3,321,009 | 5/1967 | McGee et al. | 165—107 UX |

FOREIGN PATENTS

| | | | |
|---|---|---|---|
| 821,003 | 9/1959 | Great Britain | 165—107 |

L. DEWAYNE RUTLEDGE, Primary Examiner

M. J. ANDREWS, Assistant Examiner

U.S. Cl. X.R.

55—72; 165—107, 119; 176—37